United States Patent [19]

Hillmann

[11] Patent Number: 5,743,660
[45] Date of Patent: Apr. 28, 1998

[54] CAGE FOR ROLLER BEARING ASSEMBLY

[75] Inventor: Reinhart Hillmann, Gerolzhofen, Germany

[73] Assignee: SKF GmbH, Germany

[21] Appl. No.: 797,396

[22] Filed: Feb. 10, 1997

[30] Foreign Application Priority Data

Feb. 9, 1996 [DE] Germany ............ 196 04 681.5

[51] Int. Cl.[6] ...................................... F16C 33/49
[52] U.S. Cl. ............................. 384/577; 384/572
[58] Field of Search .................... 384/572, 575, 384/576, 577, 560

[56] References Cited

U.S. PATENT DOCUMENTS 3,353,881  11/1967  Steinert .................... 384/577

FOREIGN PATENT DOCUMENTS 0 193 058A2  2/1986  European Pat. Off. .
445090       10/1934  Germany .
1 625 648    7/1973   Germany .
76720        6/1981   Japan ....................... 384/577
1 194 294    10/1970  United Kingdom .
1 594 582    8/1976   United Kingdom .
2 167 816    6/1986   United Kingdom .

*Primary Examiner*—Thomas R. Hannon
*Attorney, Agent, or Firm*—Eugene E. Renz, Jr.

[57] ABSTRACT

A cage for roller bearings, comprising a pair of spaced rings (3, 5) having confronting raceways ($R_i$, $R_o$) for plurality of rolling elements (6), the cage comprises at least one annular side ring (8), a plurality of webs (9) extending from said side ring (8) which are circumferentially spaced to define pockets (P) for the rolling elements (6). The free terminal ends of the webs remote from the side ring (8) have projecting portions (11, 12) which partially enclose the rolling elements (6). Each of said webs (9) has an elongated radial through slot (10) dividing each of said webs into web portions (9', 9") which are displacable inwardly relative to one another to permit insertion between the rolling elements (6).

7 Claims, 2 Drawing Sheets

CAGE FOR ROLLER BEARING ASSEMBLY

FIELD OF THE INVENTION

The present invention relates to improvements in cages for roller bearing assemblies. The cage of the present invention is particularly adapted for use in cylindrical roller bearing assemblies.

BACKGROUND OF THE INVENTION

Cages for cylindrical roller bearing are not new per se. German Patent No. 1,625,648 shows a cage for a cylindrical roller bearing. The cage has a series of radially extending, circumferentially spaced webs defining pockets for the rolling elements which at their free ends carry tabs which engage the axial end faces of the rolling elements. The cage webs have radial through recesses only in the terminal end regions of the webs. It has been found that this cage is therefore not suitable for universal applications. For example, it cannot be used in bearings where the rolling elements are first premounted in one bearing ring or both of the rings where one or both of the rings are provided with side flanges. Further, in large size bearings, where the rolling elements and cage are relatively large, it is extremely difficult to assembly this known cage in an axial direction between the rolling elements which have been premounted in one or both rings. Specifically, it has been found that the projections are not elastic enough to properly give way when the cage is inserted.

Sheet metal cages are also known from British Patent No. 445,090. This cage has a series of circumferentially spaced webs which extend axially outwardly from a side ring and which in plan view appear to be "T" shaped. When this cage is inserted axially, the webs are free to give way elastically in the radial direction either inwardly or outwardly until the two lateral projections of the transverse part of the T-shape element spring back behind the end surfaces of the rolling elements and thus fix the cage in position in the bearing. It has been found that this known cage can be used only when the webs come to rest either exclusively inside or exclusively outside the pitch circle of the rollers which is a circular trace through the axes of the rollers. These cages are not suitable in the case of bearings where it is desired to locate the webs in the area of the pitch circle. It is noted that it is more advantageous to guide the rolling elements in the region of the pitch circle than to guide them inside or outside the pitch circle. When guided at the pitch circle, it is virtually impossible for the rolling elements to overrun the webs which creates a deleterious, dangerous situation.

SUMMARY OF THE INVENTION

With the foregoing in mind, it is an object of the present invention to provide a cage characterized by novel features of construction and arrangement whereby the cage can be inserted easily and with minimal force in the axial direction between the rolling elements premounted in a bearing ring or between a pair of rings, wherein one or both of the rings are provided with side flanges.

The cage of the present invention comprises an annular closed side ring, a plurality of circumferentially spaced webs extending from the side ring wherein adjacent webs form pockets for rolling elements. The free ends of the webs are designed with projections which partially enclose the rolling elements and have elongated radial slots over their entire length confronting the peripheral surface of the rolling elements. By reason of the radial slots, the webs are elastically flexible in a peripheral direction over a substantial portion of their length confronting the rolling elements inwardly from their axial end faces. Thus, the projections which in the assembled state embrace the end surfaces of the rolling elements are free to give way or flex in the peripheral direction when the cage is inserted axially and then to spring back behind the end surfaces of the rolling elements after assembly.

In accordance with another feature of the invention, the projections slant outwardly or expand conically in a region starting from the end surface of the web and proceeding axially inwardly, toward the end surfaces of the rolling elements. This, facilitates easy insertion of the cage axially. More specifically, when the cage is inserted axially, the web parts are displaced axially in the peripheral direction by the rolling elements until the cage is in its intended assembled position.

In accordance with still additional features of the present invention, the radial through slots in the area of the projections are expanded additionally by providing openings to increase the elasticity of the web parts in this region. In accordance with still a further feature of the invention, recesses in the lateral or side surfaces of the web members facing the rolling elements have a similar effect in the area of the center of the rolling elements.

These recesses can be provided only in the area of the pitch circle or they can also extend radially over the entire thickness of the webs. In the latter case, it provides the advantage not only of allowing the webs to flex elastically in the manner described above but also forms reservoirs for lubricant or creating open spaces through which lubricant and possibly also dirt particles can pass. In accordance with the embodiment where the recesses extend radially over the entire thickness of the webs, the rolling elements are guided only near their outer end faces.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENT

Figure 1:
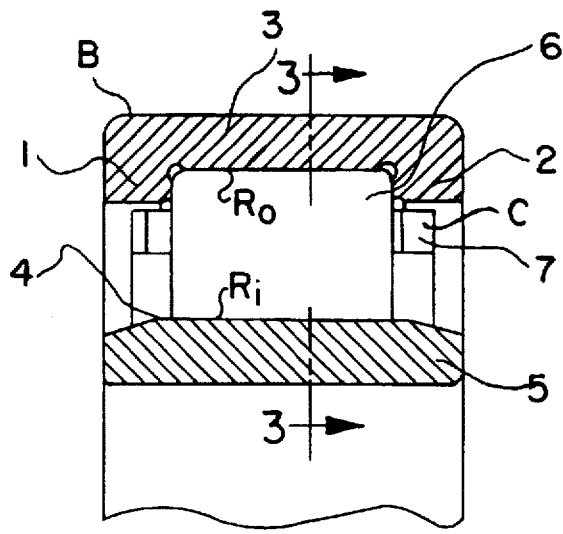
FIG. 1 is a schematic fragmentary cross-sectional view through a cylindrical roller bearing assembly with a cage constructed in accordance with the present invention.

Referring now to the drawings and particularly FIG. 1 thereof, there is shown a bearing assembly generally designated (B) comprising an outer ring (3), having radially inwardly directed axially spaced flanges (1, 2) having an outer raceway ($R_o$) between the flanges and an inner ring (5) having an raceway ($R_i$) and a plurality of cylindrical rollers (6) in the annular space between the inner and outer rings which are uniformly distributed in the annular space by a cage (7). The cage (7) also maintains the axes of the rollers parallel during running of the bearing.

Figure 2A:
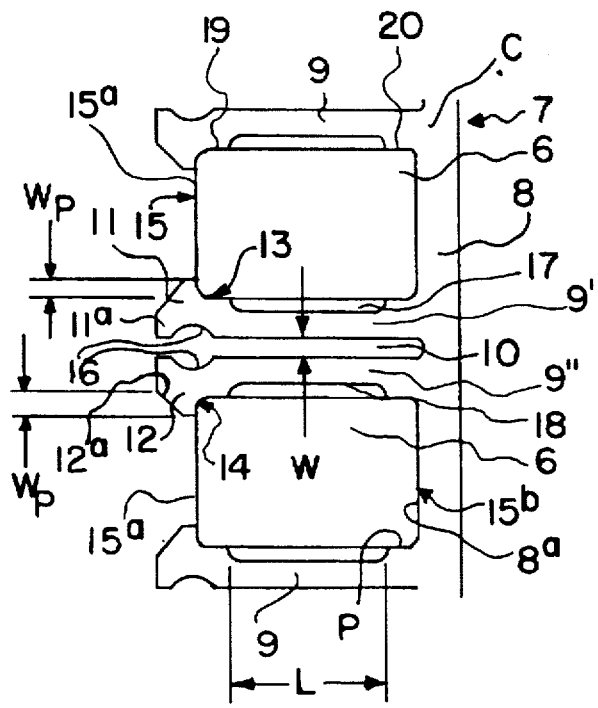
FIG. 2A is a schematic fragmentary developed plan view of a cage constructed in accordance with the present invention.
Figure 2B:
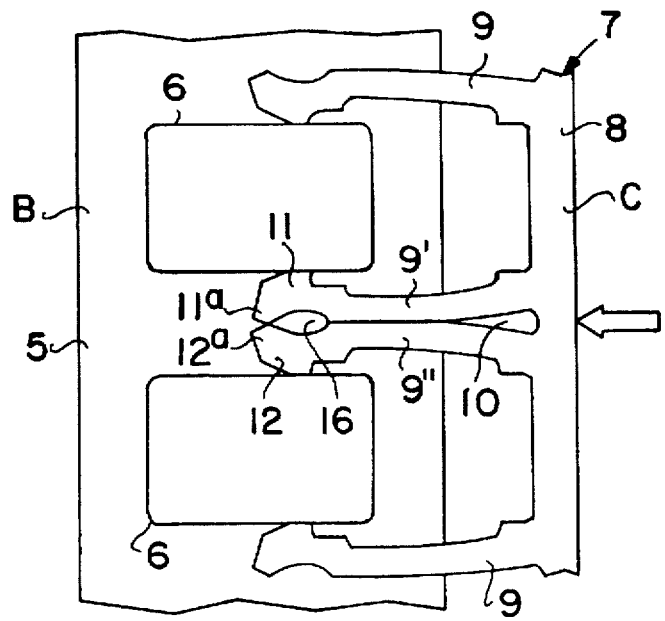
FIG. 2B is a view similar to FIG. 2A but showing the cage being assembled to a roller bearing, wherein the webs of the case being flexed and the free terminal ends being compressed between adjacent roller.

As best illustrated in FIG. 2, the cage (7) comprises a closed annular side ring (8) of annular shape have a plurality spaced webs (9) extending axially inwardly and circumferentially spaced to define a plurality of pockets (P) for the roller (6). As illustrated, each web (9) is divided by a slot (10) to define two elongated web portions (9', 9"). As illustrated, the slot (10) extends from adjacent the inner edge of the side ring (8) axially to the free terminal ends of the web portions (9', 9"). Each of the web parts (9', 9") is enlarged at its free terminal end to define a peripheral projection (11, 12) having axially inwardly facing surfaces (13, 14) which confront and engage the inner axial end faces (15a) of the cylindrical rollers (6) and thus fix the cage (7) in the bearing in the axial direction with respect to the cylindrical rollers (6). The shoulders (13, 14) are generally parallel to and axially spaced from the edge (8a) of the side ring confronting the opposite axial end face (15b) of the cylindrical rollers (6).

The width (W) of the slot (10) is preferably slightly greater than the combined width (Wp) of shoulders (13, 14) so that when the cage is assembled by inserting it axially between the adjacent rollers, the free terminal ends of web portions (9', 9") can be compressed in the peripheral direction so that in the compressed state, they can pass between adjacent cylindrical rollers (6). To facilitate the assembly process, the projections (11, 12) are beveled or provided with beaks as at 11a, 12a. To facilitate additional expansion or deformation in the assembly process, the terminal ends of 11a, 12a of the projections are provided with an internal generally circular cut-out as at 16. This permits the beaks 11a and 12a to be deformed axially outwardly under compression when inner confronting side faces of the adjacent web parts (9', 9") are pressed together adjacent the terminal ends as in the manner FIG. 2b.

Figure 3:
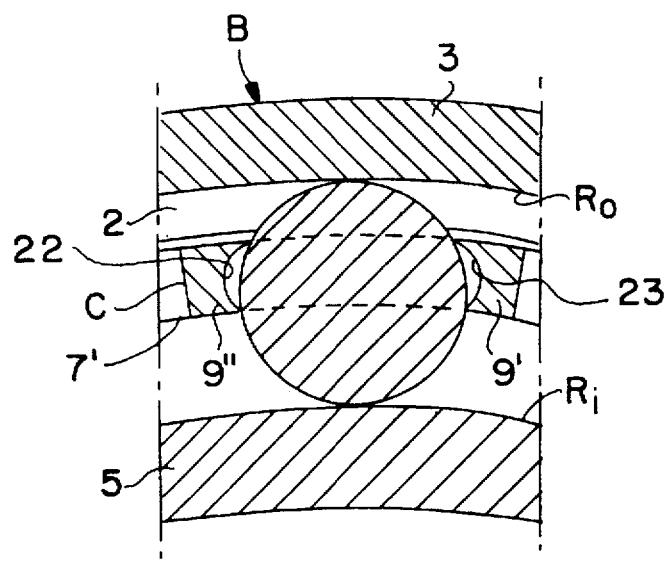
FIG. 3 is an enlarged fragmentary sectional view taken on the line 3, 3 of FIG. 1 showing a modification to the cage, wherein the web surfaces facing the rollers having pockets for the retention of a lubricant.

The confronting edges of the web portions (9', 9") of each web have a cut-out form therein of an axial length (L) less than the length of the rollers to define guide and holding surfaces (19, 20) which confront the peripheral surface of the rollers adjacent the axial end faces (15a, 15b). The cut-outs thus formed define all-through radial recesses (17, 18) between the web portions (9', 9") and the outer diameter of the cylindrical rollers. The recesses increase the elasticity of web parts (9', 9") and may also be designed to form reservoirs (22, 23) for lubricant as shown in FIG. 3. Further, the recess (17, 18) allow the unincumbered passage of lubricant and dirt particles between the lateral surface of the rollers and the web of the cage. These reservoirs (22, 23) may be closed radially as shown in FIG. 3.

Even though a particular embodiment of the invention has been illustrated and described herein, it is not intended to limit the invention and changes and modifications may be made therein within the scope of the following claims.

What is claimed is:

1. A cage for roller bearings having a plurality of rolling elements (6), said cage comprising an annular side ring (8), a plurality of webs (9) extending from said side ring (8) which are circumferentially spaced to define pockets (P) for the rolling elements, said webs having lateral surfaces facing said rolling elements and having free terminal ends, the free terminal ends of the webs remote from the side ring (8) having projecting portions (11, 12) which partially enclose the rolling elements (6), each of said webs (9) having an elongated radial through slot (10) dividing each of said webs into web portions (9', 9") which are displacable relative to one another in the peripheral direction to permit insertion of the cage between the rolling elements (6).

2. A cage for roller bearings according to claim 1, characterized in that the projecting portions (11, 12) are designed to slant outwardly or conically expand, starting from the end surface of the webs (9, 9', 9") and proceeding axially inwardly toward the end surfaces (15) of the rolling elements (6).

3. A cage for roller bearings according to claim 1, characterized in that the slots (10) are expanded additionally in the area of the projecting portions (11, 12) by openings (16).

4. A cage for roller bearings according to claim 1, characterized in that the lateral surfaces of the webs (9, 9', 9") facing the rolling elements (6) are provided over a portion of their length with recesses (17, 18).

5. A cage for roller bearings according to claim 4, characterized in that the recesses (17, 18) are located in the area of the pitch circle of the rolling elements (6).

6. A cage for roller bearings according to claim 4, characterized in that the recesses (17, 18) are designed to extend radially over the entire thickness of the web.

7. A cage for roller bearing according to claim 4, characterized in that the recesses (17, 18) forming reservoirs (22, 23) are closed in the radial direction.

* * * * *